June 2, 1931. J. LEDWINKA 1,808,561
PRESSED METAL VEHICLE BODY
Filed Jan. 8, 1927 8 Sheets-Sheet 2
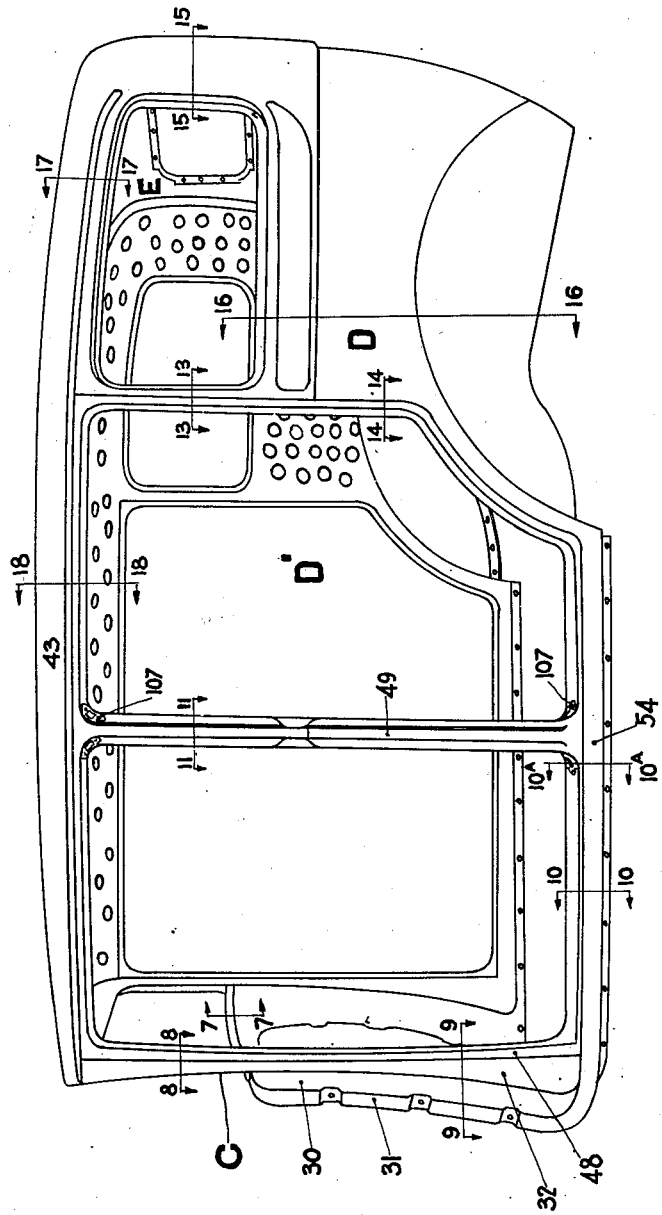
INVENTOR.
JOSEPH LEDWINKA
BY
ATTORNEY.

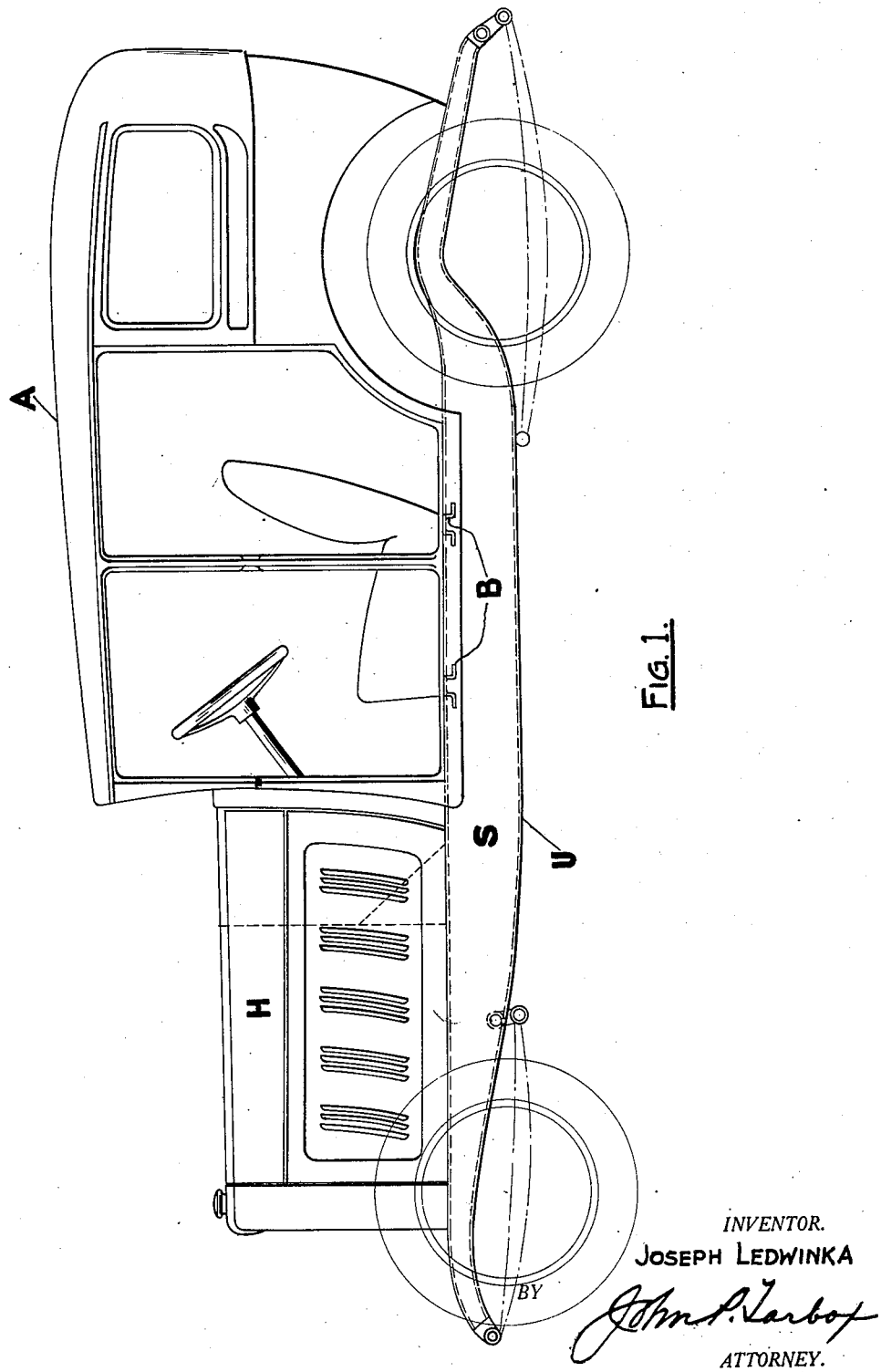

June 2, 1931. J. LEDWINKA 1,808,561
PRESSED METAL VEHICLE BODY
Filed Jan. 8, 1927   8 Sheets-Sheet 3
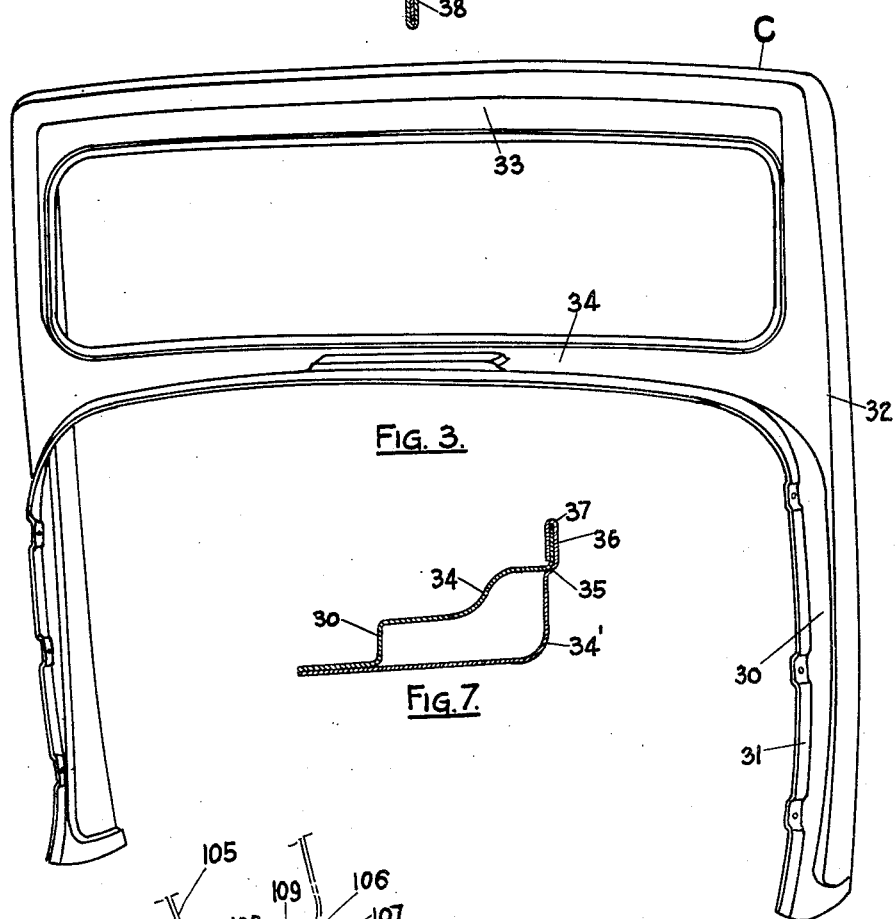
INVENTOR.
JOSEPH LEDWINKA
BY *John P. Tarbox*
ATTORNEY.

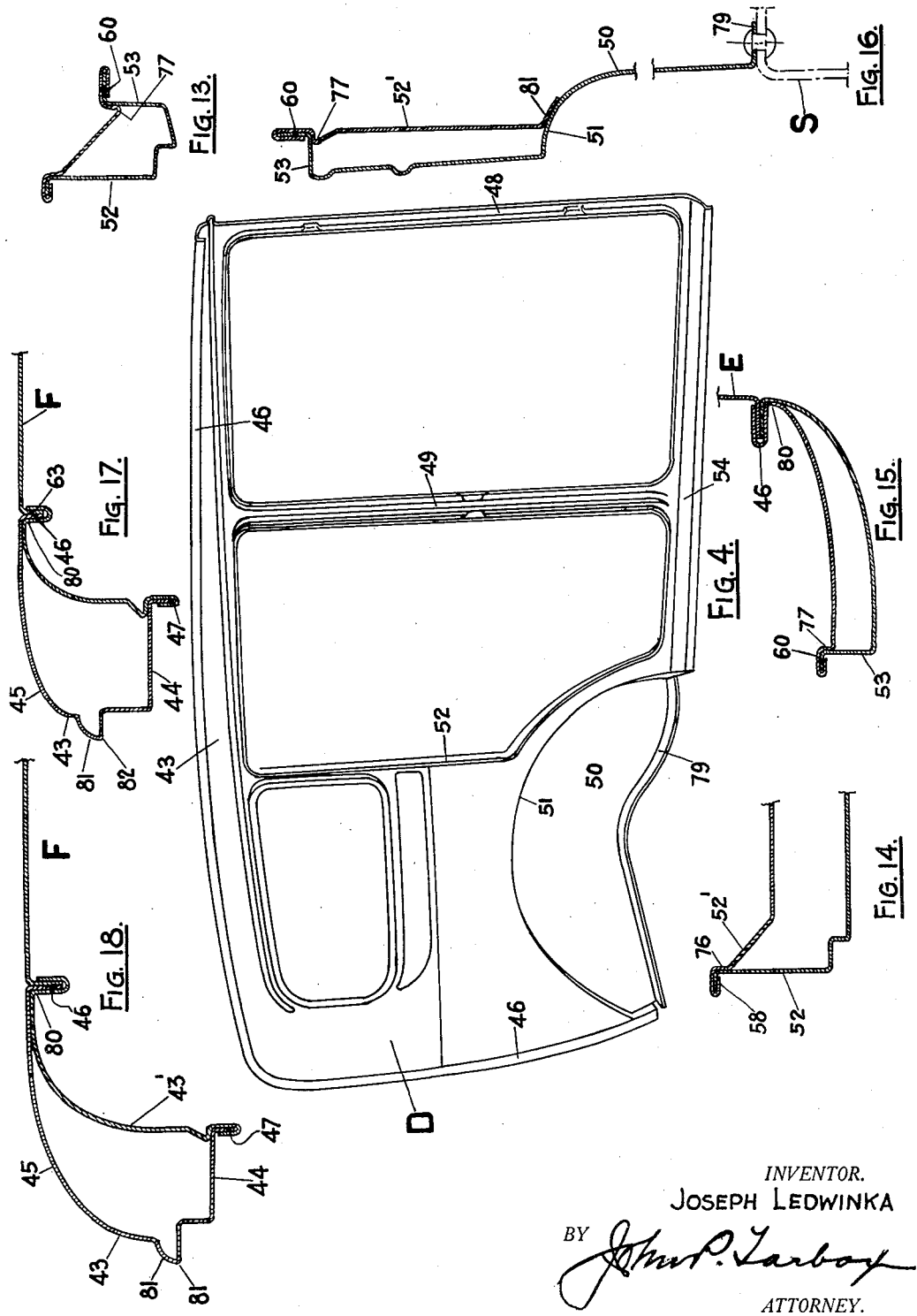

June 2, 1931.  J. LEDWINKA  1,808,561
PRESSED METAL VEHICLE BODY
Filed Jan. 8, 1927   8 Sheets-Sheet 5
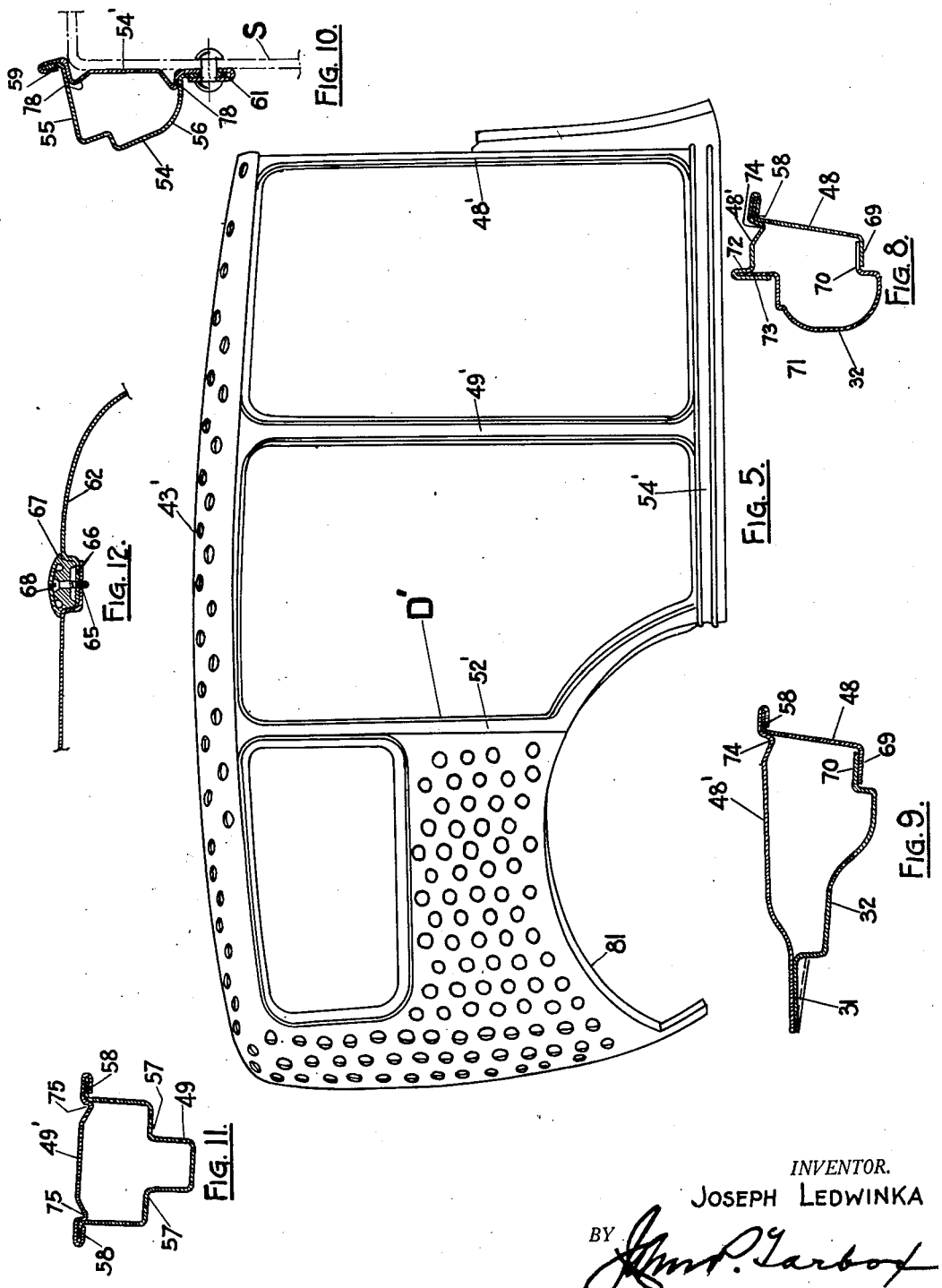
INVENTOR.
JOSEPH LEDWINKA
BY
ATTORNEY.

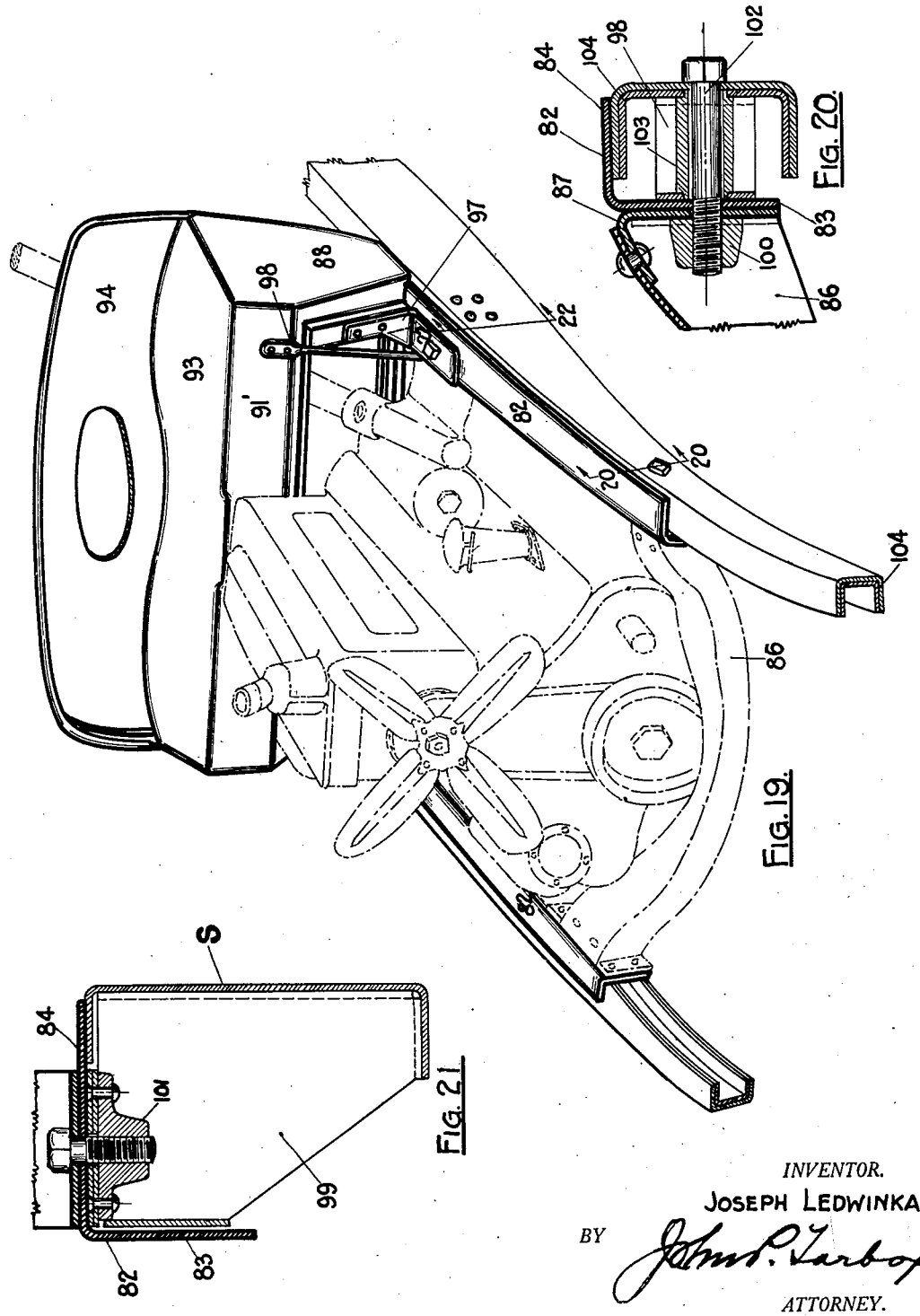

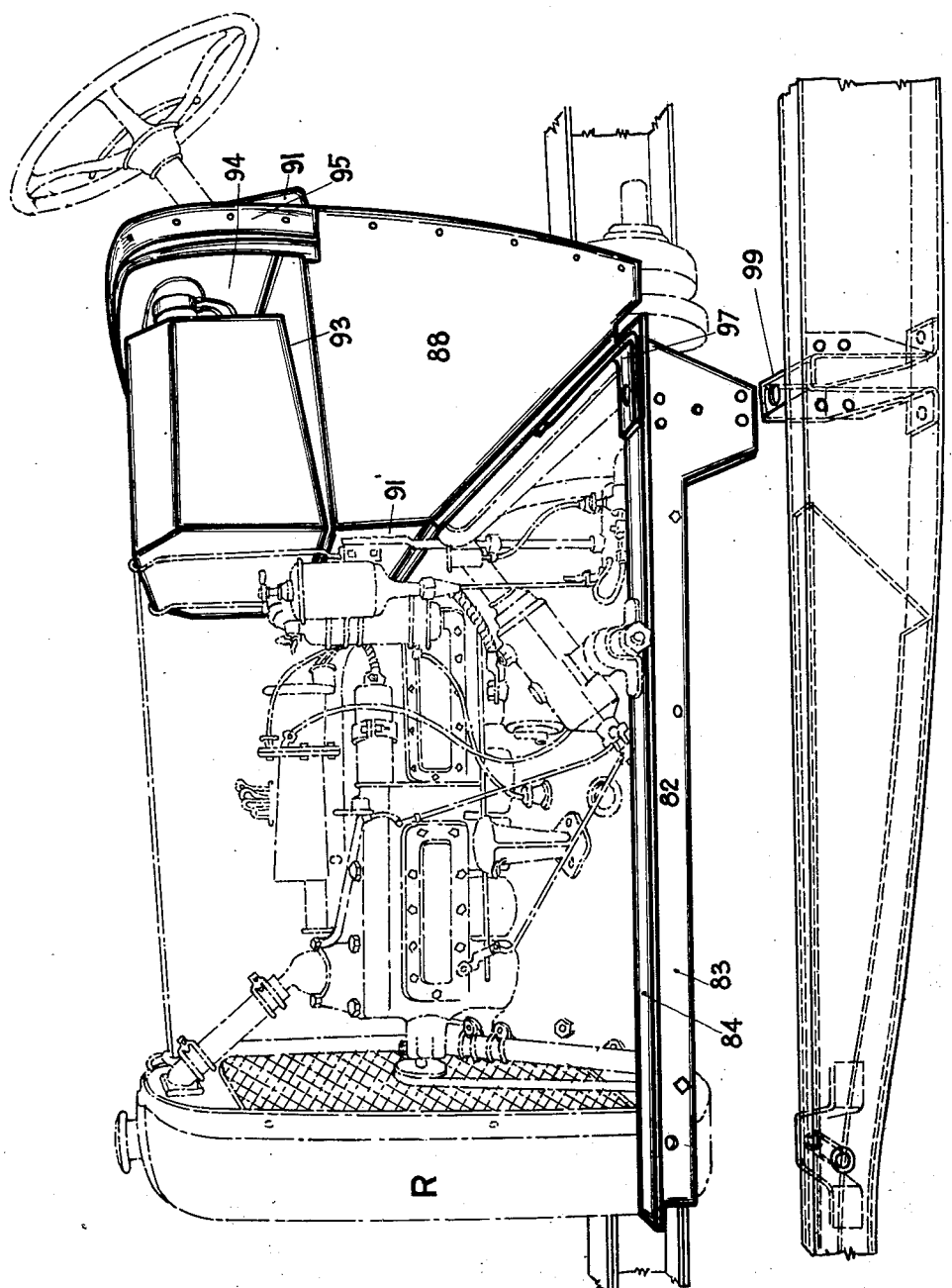

INVENTOR.
JOSEPH LEDWINKA
BY
ATTORNEY.

Patented June 2, 1931

1,808,561

UNITED STATES PATENT OFFICE

JOSEPH LEDWINKA, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA

PRESSED METAL VEHICLE BODY

Application filed January 8, 1927. Serial No. 159,827.

The present invention relates to pressed metal bodies for automotive vehicles and, more particularly, to bodies of this class built up out of sub-assembly units.

It is an object of my invention to reduce the sprung weight of such bodies and to facilitate their manufacture and decrease their cost, while at the same time, retaining that strength and beauty of line, required in the art of the successful body builder, or even surpassing prior efforts in this direction.

It is a further object of my invention to provide a construction which permits me to have even greater accuracy of door and window openings than was heretofore attainable in the pressed metal body art.

I accomplish these objects, in part, by providing a body underframe comprising deep section side sills and cross members for supporting the floor boards and seat structures of my improved body very much after the manner pointed out in my copending application, Serial No. 158,487, which underframe also supports the various automotive organs of the vehicle and is extended forwardly and rearwardly of a body superstructure, and serves also the function of a chassis, the wheels being sprung directly from the front and rear ends of the sills. This at once enables me to avoid a duplication of cross members in body and chassis and also, because of the relatively deep section of the sills at the thresholds sections thereof permits them to be made of lighter gauge sheet metal than the ordinary chassis sills and also avoids the necessity of providing the body superstructures with the usual body sills of heavier gauge than the body paneling.

These objects are further, and this is perhaps of paramount importance, attained by the provision of a body superstructure erected upon the side sills which is made throughout of light gauge sheet metal and of only a very few stampings, which stampings are joined together by the simplest of joints and yet joints which impart strength to the structure as a whole and make of the body superstructure a substantial integral entity of great rigidity which can be handled and shipped as a unit without danger of damage. I attain great strength in this superstructure through the curvilinear and deep drawn inter-communicating sections of the outside panels and their joinder along certain of their edges with corresponding inside panels, whereby a hollow structure, strong, and rigid, is produced, which yet, because of the elasticity of the material of which it is made, namely steel, allows that flexibility which is required of vehicle bodies of this type under the conditions of usage.

Another feature which permits me to attain these objects is the formation of the front or cowl section of the body superstructure of a small depth, so that this entire front cowl and windshield frame can be made of one unitary sheet metal stamping thereby saving numerous joining operations and in this, as in the formation of the other relatively few stampings effecting a great saving both in die cost and also by the elimination of numerous operations of forming and joining of parts. I attain the perfect dimensions of the doors and window openings and thus secure a better fit of the doors by reason of the necessary accurate dimensioning of the large die stampings which contain the door openings and by reason of the simple joinder without the necessity of welding the edges of the inner and outer panels surrounding the door openings.

This accurate formation of the door and window openings, I attain by so rounding the corners of the inwardly extended sides of these openings, that they may be formed by stamping or die drawing operations without tearing the metal at the corners.

Another object of my invention, and one of paramount importance is the production of a body having lines and contours which adapts it especially for being constructed out of steel. Heretofore, pressed steel bodies have been constructed mainly on lines and contours substantially similar to those of composite bodies, which were designed primarily for construction out of wood. The characteristics of wood and steel being so widely different, body designs drawn up primarily to adapt them for construction in wood are ill adapted for construction in steel, and bodies so constructed of steel were relatively complicated, involving a relatively great number of parts, and consequently a great number of different die stamping and joining operations. In designing a body especially adapted for steel in furtherance of this object of the invention, I am able to reduce the number of parts entering into the construction of the body very materially, say, from several hundred to less than one hundred.

In addition to these features contributing to the attainment of the objects of the invention, I provide a particularly convenient arrangement of the power unit by bringing together in this unit the toe board supports and instrument board, gas tank, radiator etc., and by so mounting it that it may be most conveniently assembled or disassembled from the rest of the vehicle structure for repair or replacement. The small depth of the cowl structure of the body superstructure proper contributes to the easy removal of the power unit assembly, and easy access is had to the power unit assembly by merely lifting the sides of the hood, which extends from the radiator to a point adjacent the plane of the windshield frame and the front door posts, over a reduced forward extension of the cowl which, in this embodiment of my invention, forms a part of the power unit assembly.

Other and further objects and advantages will become apparent from the drawings and the detailed description and the structures by which they are attained will be pointed out in the appended claims:

In the drawings:

Figure 1 is a view in side elevation of an automotive vehicle embodying the invention.

Fig. 2 is a perspective view of the unitary body superstructure forming a primary feature of the invention.

Fig. 3 is a perspective view of a one piece stamping forming the front of the body superstructure shown in Fig. 2.

Fig. 4 is a perspective view of the inside of a one piece stamping forming a side of the outside shell of the body superstructure.

Fig. 5 is a similar view of a one piece stamping forming an inside side panel.

Figs. 6 and 7 are sectional views, respectively, of the upper and lower windshield headers, the section being taken substantially in the longitudinal vertical plane of the body.

Figure 23:
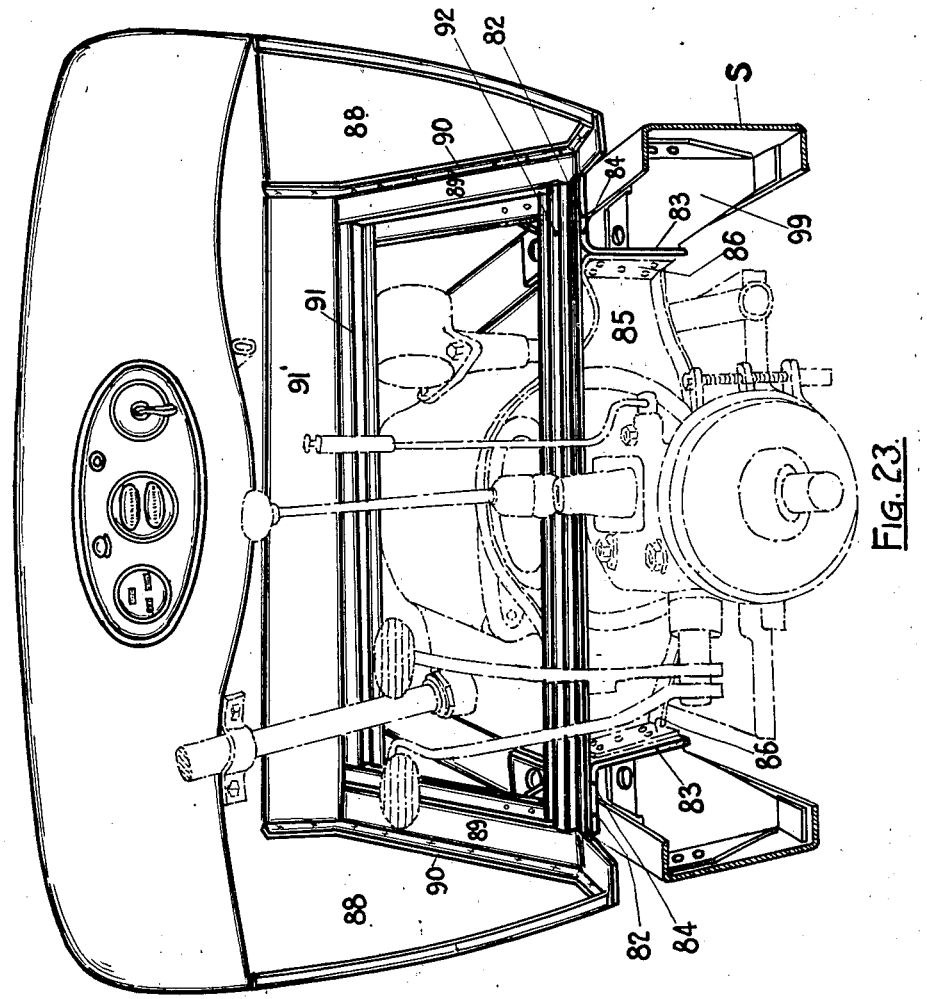

Figs. 8, 9, 10, 10A and 11 are detail sectional views, the sections being taken respectively on the lines 8—8, 9—9, 10—10, 10A—10A and 11—11 of Fig. 2.

Fig. 12 is a detail section view showing the joint between the rear panel and the roof panel, the section being taken substantially in the central vertical longitudinal plane of the body.

Figs. 13, 14, 15, 16, 17 and 18 are detail sectional views, the sections being taken, respectively, on the lines 13—13, 14—14, 15—15, 16—16 and 17—17 of Fig. 2.

Fig. 19 is a perspective view, as viewed from the front of a power unit assembly, showing the same mounted in place on the side sills of the body underframe, the gas tank being omitted.

Figs. 20 and 21 are detail vertical transverse sectional views, the sections being taken, respectively, through the front and rear securing means between power unit sub-assembly and side sill.

Fig. 22 is a side view in perspective of the power unit sub-assembly showing it and the side sills in their relative positions when the power unit has been raised off its seat.

Fig. 23 is a rear view in perspective showing the same relative positions between power unit and sills as that shown in Fig. 22.

In these drawings the sections are viewed in the directions indicated by the arrows at the ends of the section lines and similar parts appearing are designated by similar reference characters wherever they appear on the several views.

In the following description the improved vehicle body structure will, for convenience of description, be described as consisting of three main units, namely, the body underframe or chassis U comprised principally of the side sills S and suitable cross braces as B, the power unit assembly M, which also serves to interbrace the sills in their forward regions, and the body superstructure unit or body proper A.

The underframe or chassis U may be constructed substantially similar to that disclosed in my copending application Serial No. 158,487 and may be comprised of substantially channel section side sills S having in the region of the thresholds and for some distance forwardly of the thresholds relatively deep vertical webs to afford strength in this region and to permit the use, if desired, of lighter gauge stock than is ordinarily employed in vehicle chassis sills. These sills are preferably bent longitudinally when viewed in plan to conform generally to the lines of the body superstructure or body proper A. Suitable cross braces B interconnect sills and serve to support the seat structures, floor boards and various automotive organs of the vehicle. From the ends of these sills, the undersides of which are offset upwardly, to allow for the vertical movements of the front and rear axles, the wheels and axles are sprung in the manner described and claimed in my above referred to application or in any other suitable manner. From the foregoing, it will be obvious that the body underframe U, besides its functions of rigidly interbracing the sides of the body superstructure A when the same is mounted in place thereon in the manner to be presently described, and of carrying such body elements as the flooring and seat supports, has also the functions of a chassis, and the construction of this underframe may be varied rather widely, and except as that construction enters into combination with the novel superstructure unit A and the power unit sub-assembly, applicant does not wish to limit himself to the use of any particular type of underframe or chassis structure.

The body superstructure unit or body proper A, which forms the main feature of the invention claimed in this application is made up of comparatively few relatively light gauge sheet metal panels, which may be and preferably are unitary or one piece stampings, shaped to those curvatures which provide at once pleasing body lines and great inherent strength, and having their meeting edges formed with complemental formations, which permit the joinder of these stampings into a rigid structure, essentially a one piece downwardly open box structure, capable of being handled and shipped and mounted on the underframe or chassis as a unit. In the embodiment of my invention shown, I have provided a body structure made up mainly of but seven major sheet steel stampings, a front stamping C, two outer side stampings D, two inner side stampings D', a rear panel stamping E, and a roof panel stamping F. It will, of course, be understood, that certain of these stampings could, if desired, be made in one or more initial stampings joined before final assembly into an integral whole, as by welding or otherwise, but I find that I am able to obtain much greater accuracy in door and window fitting and to obtain a very substantial economy in manufacture, which is one of the prime objects of the invention, if I make these seven major stampings as single one piece stampings, and I prefer, therefore, to form them in this way.

The front stamping C comprises the relatively shallow cowl section 30, having an inwardly offset flange 31 extending all along its front edge and adapted to provide a recess to receive the rear edge of the hood H, Fig. 1, and the outwardly and forwardly facing portion 32 of the front corner or A posts, as well as the forward portions 33 and 34 of the upper and lower windshield headers, connecting the tops of the A post structures, and forming with the A post structures, the windshield frame. The forward portion of the upper windshield header or peak panel is projected forwardly to provide a short visor, its upper portion extending substantially horizontally and forming the forward portion of the roof structure. This stamping C in itself forms an inherently rigid and strong front body wall unit by reason of the offset formation at the rear edge of the cowl providing lower portions of the A-post structures and the inwardly flanged formation at the windshield opening and at the top and sides of the portions forming said opening, and thus forming a rearwardly or inwardly presenting interconnecting channel frame top and sides of said opening, and by reason of the further lateral flanging in the margins of the windshield opening and in the outer margins. In order to further stiffen and strengthen the upper and lower windshield headers, inner stampings 33', 34', providing interior finish to the headers are provided. The lower of these stampings 34' has a horizontally extending branch having its forward edge secured, as by welding, to the flange 31 of the outer portion 34, and a vertically extending flange having its upper portion offset rearwardly to form a seating shoulder 35 for the rear edge of the outer or forward portion 34 of the header which is formed with a vertically extending flange 36. This seating shoulder 35 forms a counter support to permit the easy crimping of the upper edge as 37 of the inner panel 34' over the flange 36, and makes, with said crimped over portion, a very strong and unyielding joint between these two portions 34 and 34' and thus constitutes the lower header a strong hollow box section structure. The outer portion 33 of the upper header is offset rearwardly at its bottom portion to bring its downwardly extending edge flange 38 into the plane of the upwardly extending flange 36 of the lower header structure. The inner portion 33' has its main body extending vertically and is offset rearwardly at its lower edge to form with the edge flange 38 of the outer or forward portion 33 a counter supported crimped joint similar to the joint 35, 36, 37 of the lower header. Along its upper edge, the panel 33' is bent into channel shape as at 38 and nests within the angle formed by the downwardly offset rear edge 39 of the forward portion 33 of the header and the edge flange 40 thereof. The forward edge of the roof panel stamping 41 is bent back upon itself and flanged downwardly at 42 and in the final assembly receives within the angle so formed the downwardly offset edge 39 and flange 40 of outer portion 33, the abutting inturned flanges 40 and 42 being then secured together as by spot welding and the free edge of the channel 38 being crimped over the said flanges thereby providing a very strong and leak-proof joint structure at this point.

The side portions of the body superstructure A comprise outer panels D in which are formed the front and rear door openings and the rear quarter window opening, in the case of the sedan type of body shown. The number of openings formed therein will, of course, vary with the type of body.

The stamping D providing the outer side wall paneling is a deep drawing conformed to the outer contour of the body and extending from the front corner or A post rearwardly around the rear corner of the tonneau. Above the door and window openings it is provided with a header or top rail portion 43 having generally a horizontally inwardly extending arm 44, and an upwardly and inwardly curved arm 45 formed on a wide curve until it extends substantially horizontally at the top and provides the side portion of the roof structure. The header portion 43 is flanged downwardly at 46 along its upper and inner edge for attachment to the roof panel stamping or other roof structure. The horizontal branch 44, Figs. 18 and 17, is flanged downwardly at 47 along its inner edge above the door and window openings.

Stamping D is formed with the vertical portions 48 of substantially Z section along its front edge forming, as shown in Fig. 9, a portion of the hollow A post structure, and between the door openings it is provided with the vertical portion 49 of substantially channel cross section forming a portion of the B—C post. In the tonneau section stamping D is formed with the usual wheel housing depression 50, the crown 51, of which forms, with the inwardly extending arm 52, extending along the rear edge of the rear door opening, a substantially channel section portion serving as the lower outer portion of the D post. Around the rear quarter window tne stamping D is provided with an inwardly extending arm 53 corresponding to the inwardly extending arm 52 at the rear edge of the rear door opening but of less depth. The longitudinally extending portion 54 below the door openings is also of substantially inwardly presenting channel form in cross section, the upper side 55 of which channel is upwardly and inwardly inclined to form the thresholds of the doors and the bottom of the channel merges by a wide curve 56 into the inwardly extending lower side of the channel.

The channel section vertical portion 49 forming a portion of the B—C post structure is formed on its forward and rearward side with rabbets 57 to receive the correspondingly shaped door rail structure.

Along their inner edges the vertical portions 48, 49 and 52 forming portions, respectively, of the A, B—C and D post structures, are each formed with laterally extending flanges 58 and the thresholds 55 are provided with upwardly projecting flanges 59 forming, with the flanges 47 at the tops of the door openings and flanges 58 on the post portions, door stops, these flanges 58, 59, 47 serving, as will presently be described, as means for securely joining the inner and outer panels. The inwardly projecting arm 53 extending around the rear quarter window is correspondingly flanged at 60.

The threshold section 54 of the outer panel stamping D is provided along its lower edge, as shown in Fig. 10 with a downwardly extending flange 61 corresponding generally to the flanges 47, 58, 59 and 60.

The flanges 46 formed along the upper inner edge of the outer side panel stampings are extended around the curved rear upper corner of the tonneau downwardly to the bottom edge of the stamping serving thereby not only for the securement of the roof panel F to the outer side panels D but also for the securement of the rear panel E thereto. The rear panel extends from side panel to side panel and from the bottom edge of the tonneau to and around the arched over rear portion of the tonneau at its upper forward portion 62, as shown in Fig. 12, to form a portion of the roof structure. Both the roof panel F and the rear tonneau panel F are formed along their side edges, respectively, with flanges 63 and 64, which abut the flanges 46 on the outer side panels D and are rigidly secured thereto, as by welding.

The roof panel and the rear tonneau panel are joined along their meeting edges by the offset overlapping flanges 65 and 66, which may be welded together and the channel formed by the offset flanges may be covered, as shown by a moulding strip as 67, secured by screws 68. At the front the outer side panels D are joined to the A post section 32 of the front stamping C by having the outer forwardly extending arm 69 of the A post portion of the side stampings lapped over an inwardly offset flange 70 of the portion 32 and welded thereto. The inward offset is for the purpose of providing a rabbet to receive the door overlap. The threshold sections 54 and the header 43 above the doorway openings, a well as the D post section are correspondingly formed with rabbets to receive the door overlap.

A feature which I have shown incorporated in the outer panel structure is the provision of an outward projection 81 extending longitudinally above the door and window opening substantially the full length of the body. This projection has its upper surface extending outwardly and downwardly and its lower surfaces extending substantially horizontally and forming with said upper surface, with which it is joined by a relatively sharp curve 82, a drip moulding integral with the side peak panel portion 43 of the outer paneling.

From the foregoing description, it will be seen that the outer shell consisting of the stampings forming body wall units C, D, E, F and connected to form an integral whole in the manner described is in itself inherently a strong and fairly rigid structure, with no reinforcing framework except the various deep channel or other inter-communicating sections reinforced by edge flanges around the door and window openings and the edge flanges by which the various stampings are joined. Under some conditions, it might be in and of itself when connected to the underframe or chassis in the manner presently to be described, sufficiently rigid and strong to withstand the stresses and strains of usage, but I preferably provide internal reinforcing and strengthening means, which, when combined with the outer shell in the manner to be described, forms with certain portions thereof hollow truss structures of great strength and rigidity, although light in weight, and which covers up all raw and exposed edges and provides at the same time a relatively smooth interior surface for the body to which the upholstery may be directly applied.

To this end, I provide, in the present embodiment of my invention, two inner panel side stampings D', one for each side of the body, these stampings conforming generally in outline to the corresponding outer stampings D, and having their bodies spaced from the bodies of the outer panel stampings and their edges generally shaped to fit and mate with the corresponding edges of the outer panel stampings D, or said outer and inner panels may have an edge of one joined to the body of the other remote from its edge through laterally offset portions of one or the other of said panels, as at the crown of the wheel housing, for example. The corresponding vertical and horizontal portions of these inner stampings D' are, however, relatively flat as compared with the deep drawn channel portions of the outer stamping and thus they provide a smooth interior, and also lend themselves, when combined with the outer panels, to the hollow truss construction so desirable to impart strength and rigidity. Being made up of relatively light gauge sheet steel, however, they do not prevent such flexibility as is desirable to allow the body structure to weave or twist under the conditions of usage to which such bodies are subject.

In the embodiment of my invention selected for illustration, I have shown the inner panel stamping D' substantially co-extensive with the outer panel stamping D, except in the region of the wheel housing where the lower edge of the inner side stamping ends at the crown of the wheel housing. It is provided with longitudinal top and bottom portions 43' and 54' corresponding to the outer panel portions 43 and 54, and with vertical portions 48', 49' and 52' corresponding to the corresponding vertical portions 48, 49 and 52 of the outer panel stamping D. The inner panel stampings D are locked to the outer panel stampings for the most part, and particularly about the door and window openings, by locked clinched joints, whereby the resulting structure is, in effect, a one piece structure. The specific manner in which this joinder of the inner stamping D' to the outer paneling is effected in the present instance will now be described.

At the front, the vertical portion 48' of the stamping D' is widened in its lower section to correspond to the depth of the cowl and is joined along its forward edge to the flange 31 of the cowl by spot welding. In its upper section it is relatively narrow and is joined to the A post portion 32 of the front stamping, which is here formed with a forwardly and inwardly presenting angle 71 adapted to receive the edge of the windshield, by having an inwardly extending flange 72 along its forward edge turned over and clinched upon the inwardly extending flange 73 of the front stamping portion 32. Along its rear edge, the portion 48' of the stamping D' is formed some distance from the edge with a locking shoulder 74 formed, in this instance, by forming a continuous indentation therein paralleling the edge, which edge is clinched over laterally extending flange 58 of the vertically extending A post portion 48 of the outer panel stamping. This locked clinched joint is used wherever practical in the assembly of the inner panel to the outer panel and provides a very secure joint, which is one of the features of my invention. This joint is particularly advantageous around the door and window openings since, extending entirely around the openings, it forms in effect a huge annular rivet of the size of a door or window opening and effectually prevents any movement of the outer and inner panels with relation to each other.

At the B—C post, the substantially flat inner panel portion 49' is similarly formed with outwardly facing locking shoulders 75 provided by indenting the metal at some distance from the edges and paralleling the edges and the edges are clinched over the laterally extending flanges 58 of the outer portion 49 of the B—C post.

At the D post section the body of the inner panel stamping is offset outwardly with respect to the inner flanged edge of the arm 52 of the outer panel, Fig. 14, and the locking shoulder is here formed similarly to the shoulder at the side of the windshield opening by a transversely extending portion 76 of the portion 52', lying against the inside surface of the arm 52, while the edge portion beyond said shoulder is clinched over the laterally extending flange 58 on the arm 52.

A similar joinder is effected between the outer and inner panel stampings through the shoulder 77 and the clinched over edge fastened upon the laterally extending flange 60 surrounding the side window opening in the outer panel stamping.

The lower threshold portions 54 and 54' of the inner and outer panel stampings are joined by the same locked clinched joint construction employed in the vertical post constructions, through the shoulders 78 formed on the inner panel portion 54' and the clinched over edges clinched upon the flanges 59 and 61 of the outer panel portion 54. The body of the inner panel portion 54' extends vertically to lie flat against the outside of the side sill S of the underframe or chassis and is offset outwardly a slight distance beyond the upper flange 59 and the flanged over edge, whereby the threshold 55 of the outer panel and the shoulder portion 78 of inner panel overlie to a slight extent the upper portion of the sill S when the parts are in assembled relation.

Thus, the upper portion of the channel section chassis side sill S nests slightly within the inwardly and downwardly presenting seat provided in the threshold sections of the body superstructure and the parts are secured rigidly in assembled relation by riveting, as shown in Fig. 10, through the relatively wide clinched over joint 61, 54' and the web of the sill S. The body superstructure is further secured to the underframe or chassis at the rear, by riveting through the inwardly extending flange 79, Fig. 16, of the outer tonneau paneling, which flange extends substantially continuously from D post to D post, and the upper side of the channel sill and a rear cross member (not shown) upon which the transverse portion of said flange 79 rests, and, at the front, by securing the forward edge of the cowl to a suitable dash structure mounted on the chassis, which in the instant case forms a part of the motor unit sub-assembly.

Along its top and rear edges the inner panel stamping is formed adjacent said edges with an angle portion 80 nesting within the angle formed by the body of the outer panel and the inturned edge flange 46, and the edge portion is clinched, as indicated in Figs. 17, 18 and 15, over the welded together inturned flanges at the abutting edges of the outer side panels and the roof panel and the corresponding edges of the outer side and rear panels. At the wheel housing section of the tonneau, the inner panel section 52' is laterally flanged at 81 along its lower curved edge which conforms to the curvature of the crown 51 of the wheel housing, and this flange 81 is secured by spot welding to the crown of the wheel housing.

The ends of the inner cross members 33' and 34' forming parts of the upper and lower windshield headers are connected in any suitable fashion, preferably by welding, to the vertical A post portions 48' of the inner side panel stampings D, whereby the interior reinforcing paneling is substantially continuous around the sides and front of the body superstructure and forms, with the outer paneling, a substantially continuous hollow structure at sides and front.

So secured along its outer edges and along the edges of the door and window openings, the inner side panel stampings D and the outer panel stampings D, E and F form what is in effect a one piece downwardly open box-like structure, which is strong and rigid and capable of being handled and shipped independently of the body underframe or chassis U and yet one which is from 15% to 20% lighter in weight than corresponding structures made of sheet metal stampings as heretofore constructed, and one which is, because of the few parts and the simplicity of the joinder, relatively inexpensive to make. Obviously, I may, if desired, join the parts, as an alternative to or in addition to clinching, by welding, and even if welding is used in joining the clinching is still desirable in certain regions as around the door and window openings for smoother finish at the openings and greater strength in the overlap.

When this body superstructure or body proper is joined to the underframe already described in the manner pointed out, a complete combine of body and chassis structure is produced, the spring weight of which is very much less than that of similar structures heretofore produced, and a structure is produced further in which the center of gravity is relatively low which gives easy riding qualities, and the inside thereof is characterized by roominess and by a neatness of finish which makes it possible to decrease in some measure the expense involved in applying the upholstery and interior trim and to dispense almost entirely of the use of wooden strips heretofore employed in metal bodies for the attachment of upholstery or trim.

It will be noted that the inner side stampings are of a foraminated or open construction in their upper and rear portions to provide a structure to which upholstery may be readily applied and this construction also eliminates weight in regions where it may be eliminated without undue sacrifice of strength. By providing these openings in the inner paneling, access to the space between the outer and inner panels, for whatever purpose desired, is facilitated.

The unitary body superstructure or body proper hereinbefore described will be seen to be a bottomless and dashless structure, since the usual cross braces and seat structures arranged in the bottom of bodies as hereinbefore constructed are carried in this case by and assembled with the chassis and the usual dash or shroud and the instrument boards are also assembled with the chassis, in this instance being combined in a unitary structure with the motor assembly and fuel tank to form a separate unitary sub-assembly readily assembled or disassembled with the chassis either before or after the body proper has been assembled therewith. This unitary bottomless and dashless body superstructure is readily accessible for the application of the upholstery and interior trim and is well adapted to be completely upholstered, trimmed and painted before being placed upon the chassis or underframe in the final assembly.

A further feature of the invention comprises the power unit assembly and its method of assembly in and coaction with the remaining body units. As shown in Figs. 19 to 24, the foundation of this unit comprises the angle members or subsills 82 extending substantially the whole length of the unit and having vertical arms 83 and horizontal arms 84 adapted to rest upon the tops of the channel section side sills S, at the rear the motor and transmission housing are supported on these sills by a transverse channel section stamping 85 having vertical side flanges 86 riveted to the arm 83 of the motor unit sub sills 82. At the front the motor is supported by a transverse downwardly bowed channel member 86 riveted at its ends to the vertical arms of the sub sills 82 through the bracket 87. The radiator R is arranged directly over this cross member 86.

In addition to the motor and transmission casing, the motor unit comprises in its rear portion a rearwardly open housing or sub-cowl forming a reduced forward extension of the cowl adapted to project under the hood made of pressed metal stampings and consisting of the side portions 88, the rearwardly inclined bottom portion comprising the lateral toe board support stampings 89 welded to the side portions 88 through their lateral edge flanges 90 and upper and lower cross members 91 and 92 also shaped to receive the adjacent edges of the toe board (not shown) as clearly appears in Fig. 24. The upper cross member 91 is extended upwardly at 91' to form the vertical front of the housing and the sides and front are joined by the substantially flat forwardly sloping top 93. The rear edge of the sides 88 of the housing are formed to the contour of the forward edge flange 31 of the cowl 32 of the body structure heretofore described and are extended upwardly by instrument board stamping 94 which is provided with a forwardly extending flange 95 at its sides and top forming with the rear edges of the side portions 88 a continuous surface adapted to fit within the forward edge flange 31 of the cowl, and when the parts are assembled secured thereto, as by screws. The forward edge of the flange 95 is formed with a trough to carry off to the sides of the vehicle the water entering at the point between the hood and cowl.

I utilize the space forwardly of the instrument board and above the housing top 93 for the location of the gasoline tank 96. The housing and tank structure are braced and supported from the subsills 82 by angle brackets 97 and braces 98, see Fig. 19.

Thus, it will be seen that I combine in this motor unit assembly a substantially complete power plant, and that I can remove the motor unit assembly from the rest of the vehicle structure for repair or replacement by breaking a minimum of connections.

Spacing and locating brackets 98 are secured to the sills 8 to receive between the forward ends of the motor unit assembly at the cross connection 86 and similar spacing and locating brackets 99 are secured to the sills for a like purpose at the cross connection 85. Nuts 100 and 101 are secured as by riveting, as shown in Fig. 21, to the inside of the vertical portion of bracket 87 and to the bracket 99, respectively. Bolts 102 passing through aligned holes in the vertical web of the sills, the brackets 98, a spacing sleeve 103, the vertical arm of the subsill 82 and the bracket 87, cooperate with the nuts 100 to securely fasten the forward portion of the motor unit assembly to the sills S, and to interbrace the same. Similarly, the bolts 103 passing through aligned holes in the brackets 97, the horizontal arm of the subsill 82 and the top of the bracket 99, cooperate with the nuts 101 to secure the rear ends of the motor to the side sills S and to interbrace these elements. Thus, a very simple and secure, yet easily detachable connection is provided between the motor unit assembly and the side sills S.

It will also be noted that the hereinbefore described arrangement of motor unit assembly, cowl, and hood H whereby the hood extends rearwardly almost to the plane of the windshield provides ready access to the various parts of the motor unit, including the front of the instrument board by merely lifting the sides of the hood.

It will be seen, by reference to Figs. 20 and 23, that the forward ends of the channel side sills are strengthened by nesting within them a channel-section reinforcing member 104. This reinforcement may commence, as shown in Fig. 23, from the point where the sill begins to decrease in depth and extend all the way to the front end of the sill. A similar reinforcement may be provided at the correspondingly reduced rear ends of the sills. Thus, additional strength is secured where it is most needed in a very simple and economical manner.

It will be further noted by reference to Figs. 2 and 10A that the corners of the door and window frames are formed on curves having relatively large radii which lend themselves readily to the formation by die stamping or drawing operations and furthermore, strengthen the frame structures by reason of this generous curvature. In addition to this, the doors themselves, a portion of one of which is shown at 105 in Fig. 10A., are characterized by a like curvature at the corners, and the corner curvatures thereof are formed with increasing radii from the outer side of the door inwardly to the inner side, thereby providing inclined surfaces 106 at the corners. These inclined rounded corner surfaces, I utilize in centering the door, and to this end, I provide in the rounded corners of the door frame at the top and bottom of the B—C post, as shown in Fig. 2, combined anti-rattler and door centering means, which coact with the rounded inclined surfaces on the adjacent corners of the doors to center the door and prevent rattling and slamming. Such means may comprise as shown in Figs. 2 and 10A, metal plates as 107 which are secured at their edges to the door frame and are formed with central openings around which is provided an offset flange 108. A resilient block, such as the rubber block 109 has a portion thereof projecting through the central opening in the plate 107 in position to engage the door and is held in place by the offset flange of the plate. By using this construction of door and door frame, it will be obvious that I may dispense with the usual dovetail on the jamb face of the door and the corresponding recess to receive it on the adjacent door jamb, which is a decided advantage in reducing the number of operations required and in permitting the full strength of the door jamb and door rail to be retained.

It will be seen from the foregoing description that the curved inclined faces at the corners of the door will engage the resilient blocks as the door is pushed home, and it will be closed noiselessly and centered by a wedging action and noiselessly held in closed position through all the jars of usage. This construction, therefore, constitutes a minor feature of my invention of considerable importance.

I am aware that the particular embodiment of my invention, which I have described herein, is susceptible of considerable variation without departing from the spirit of my invention and hence, I claim my invention broadly, as indicated in the appended claims.

What I claim as new and useful and desire to protect by Letters Patent is:

1. A vehicle body wall unit comprising a sheet metal stamping forming body paneling and having a closure opening within the margins thereof, the edges of said stamping surrounding the opening being flanged inwardly to a depth sufficient to form an endless framing for said closure opening including vertical and horizontal portions of the main body framing.

2. A vehicle body side wall unit comprising a sheet metal stamping having a closure opening within the margins thereof, the edges of said opening being flanged inwardly to a depth sufficient to form an endless framing for said closure opening including vertical and horizontal portions of the main body framing and further formed with an endless edge flange projecting into the opening.

3. A vehicle body wall unit comprising a sheet metal stamping having a closure opening within the margins thereof, the edges of said stamping surrounding the opening being flanged inwardly to a depth sufficient to form an endless framing for said closure opening including a main portion of a body post flanking said opening, the outer edges of said stamping emanating from the post and from at least one adjoining side, being also flanged inwardly to a depth not substantially less than the depth of the flange extending around the closure opening, whereby a hollow reinforced wall structure of intercommunicating sections results.

4. A vehicle body wall unit comprising a sheet metal stamping having a closure opening within the margins thereof, the edges of said stamping surrounding the opening being flanged inwardly to a depth sufficient to form an endless framing for said opening including vertical and horizontal portions of the main body framing, certain of the other edges of said stamping being also flanged inwardly and further laterally flanged in their margins to provide attaching and reinforcing means.

5. A vehicle body outer wall unit for closed bodies comprising a unitary sheet metal stamping having a doorway opening within the margins thereof, the edges of said stamping surrounding the opening being flanged inwardly to a depth substantially equal to the thickness of a door to form the full depth of the jamb for said doorway opening, said stamping providing vertical and horizontal portions of the main body framing.

6. A vehicle body wall unit comprising a sheet metal stamping having a doorway opening therein, the edges of said stamping at the margins of the opening being flanged inwardly to a depth substantially equal to the thickness of the door to form a continuous framing including a body post wall and a wall of a longitudinal frame member joining said post, the outer edge of said stamping being also flanged inwardly to a d th not substantially less than the thickness of the wall, whereby a hollow reinforced wall structure of intercommunicating channel section is formed on adjacent sides of said opening.

7. A vehicle body side wall unit comprising a sheet metal stamping having a closure opening in the body thereof, and flanged inwardly at the edge of said opening to form a continuous framing for said closure opening, said stamping extending inwardly around a wide curve at the top to form the side quarter of the roof structure.

8. A vehicle body side wall unit comprising a sheet metal stamping having openings in the body thereof constituting all the door and window openings in the side of the body, said stamping having its upper and rear portions turned inwardly to form respectively, a portion of the rear wall and a portion of the roof of the body, the inner margins of said portions lying in substantially the same plane.

9. A vehicle body side wall unit comprising a sheet metal stamping having a doorway opening therein, said stamping being formed at the bottom and a side of said opening into threshold and post portions of inwardly presenting channel form, of a depth substantially equal to the thickness of a door, the side walls of said threshold and door post portions adjacent the doorway opening being laterally flanged to form a door overlap, and the opposite side wall of the threshold portion being laterally flanged to provide attaching and reinforcing means through which the wall is secured to a sill.

10. A threshold construction for vehicle bodies comprising a stamping of substantially inwardly presenting channel form flanged upwardly and downwardly at its edges, the upper flange being in the plane of the door overlap and the lower flange being adapted to provide means for attaching the body to a chassis.

11. A vehicle wall construction comprising a unitary stamping having a closure opening in the margins thereof and flanged inwardly in the edges of said opening to a depth sufficient to form an endless framing for said opening, and flanged inwardly also in three edges paralleling three adjacent sides of the opening to form with the flange in the opening an intercommunicating channel section structure, the fourth flanged side of said opening being adapted to form a channel section only through joinder with an adjacent unit.

12. A vehicle body wall unit comprising a sheet metal stamping having a post portion and a portion extended forwardly of the plane of the windshield and forming at least the side wall of a cowl in advance of the post portion and of substantially the full height of the cowl and merging at its rear margin through an integral portion of said stamping into said post portion, said post portion being bent transversely inwardly of said cowl side portion and rearwardly in its inner margin and extending upwardly from the rear edge of said cowl portion to the roof and forming a substantial part of a body post flanking the windshield opening and framing the same.

13. A vehicle body wall unit comprising a unitary sheet metal stamping having a closure opening within the margins thereof, the edges of said opening being flanged inwardly to a depth sufficient to form a continuous framing for said closure opening, said stamping being extended integrally forwardly below said opening through a forward bend of its body to form a cowl portion.

14. A vehicle body wall unit comprising a sheet metal stamping having a closure opening within the margins thereof, the edges of the stamping around said opening being flanged inwardly to a depth sufficient to form a continuous framing for said opening, the stamping below said opening being extended forwardly to form the sides and top of a cowl and flanged along its rear outer edges from top to bottom to form portions of the A-posts.

15. A vehicle body front unit comprising a sheet metal stamping having a windshield opening therein, the edges of said stamping in the sides and a transversely extending portion connecting the sides of said opening being flanged inwardly to a depth sufficient to form a continuous framing around at least three sides of said opening, the outer side edges of the stamping being also inwardly flanged to form with the adjacent flanges in the opening hollow combined windshield frame and A-post structures.

16. A vehicle body wall construction comprising a sheet metal stamping having a closure opening within the margins thereof, the edges of said stamping surrounding the opening being flanged inwardly to a depth substantially equal to the thickness of the wall, and an inner reinforcing structure, said stamping and structure being spaced from each other in their bodies, but joined together in the margins of said inwardly extending flange in the opening.

17. A vehicle body wall construction comprising a sheet metal stamping having a closure opening within the margins thereof, the edges of said stamping surrounding the opening being flanged inwardly and then laterally in the plane of the closure overlap, and an inner reinforcing structure spaced from the body of the stamping but joined thereto through said lateral flange in the plane of the overlap.

18. A vehicle body wall construction comprising an outer sheet metal stamping having a generally rectangular closure opening in the body thereof, the edges of the stamping surrounding the opening being flanged inwardly to a depth sufficient to form a framing for said closure opening, and an inner reinforcing paneling, said paneling and stamping being spaced from each other in the bodies thereof, but joined together in said flanged margin of the opening by crimping in the four sides of the opening.

19. A vehicle body wall construction comprising an outer sheet metal stamping having a closure opening therein, the edges of said stamping in said opening being flanged inwardly to and then laterally in the plane of the opening, and an inner reinforcing paneling spaced from said stamping in the body thereof but joined to the laterally extending marginal flange thereof in said opening by crimping, whereby to form a finished and reinforced closure overlap.

20. A vehicle body wall construction comprising an outer sheet metal stamping having a closure opening in the body thereof, the edges of said stamping surrounding the opening being formed with an inwardly extending flange framing the opening, and an inner reinforcing panel, said stamping and panel being spaced from each other in their bodies, but joined together in the flanged margin of the outer stamping by crimping the edge of one over the edge of the other, and means interlocking the crimped joint including inter-engaging shoulders on said stamping and panel.

21. A vehicle body wall construction comprising a sheet metal stamping having a closure opening within the margins thereof, the edges of said stamping surrounding the opening being flanged inwardly to a depth sufficient to form a framing for said closure opening, one or more of the edges of said stamping remote from said opening being also inwardly flanged, and an inner reinforcing structure spaced from the body of said stamping and joined to the flanges in the opening and to said remote edge flanges, whereby a hollow reinforced double-walled construction results.

22. A vehicle body wall construction comprising a sheet metal stamping having a closure opening within the margins thereof, the edges of said stamping surrounding the opening being flanged inwardly to a depth sufficient to form a framing for said closure opening, and an inner reinforcing structure, said stamping and structure being spaced from each other in their body portions, but joined together through the flanges in said opening and in regions remote from said opening, through laterally offset portions on one or the other of said stamping and reinforcing structure.

23. A vehicle body side wall comprising a unitary sheet metal panel extending inwardly at the top and bottom, thereby providing upper and lower edge portions offset inwardly from the main body of the panel, said panel being formed with a doorway opening therein and flanged inwardly around said door opening to a depth substantially equal to the full thickness of a door, and inner paneling spaced in its body from the outer panel but joined thereto in the upper and lower edges of at least one of said panels and in the inner edges of the flange surrounding the doorway opening to form a hollow trussed wall structure.

24. A vehicle body wall construction comprising an outer sheet metal stamping flanged inwardly at the edge of a closure opening in one wall of the body and extended on a wide curve around a quarter of the body to form a portion of an adjacent wall of the body, an inner stamping, said stampings being spaced from each other in the bodies thereof but joined together through the flange at the edge of the closure opening and at a remote portion of the outer stamping substantially in the plane of said adjacent body wall.

25. In a vehicle body side wall construction having an opening therethrough, unitary outer and inner sheet metal stampings joined along their adjacent marginal edges and around the edges of said opening to form a hollow rigid wall structure, said stampings being curved inward in their upper portions to form the side of the roof structure.

26. In a vehicle body construction, an outer panel stamping having a wheel housing and a rear quarter window opening formed therein and being flanged inwardly around the edge of said window opening and an inner stiffening panel stamping joined to the outer panel along the crown of the wheel housing and along the inturned flange of the rear quarter window opening.

27. A threshold construction for vehicle bodies comprising an outer stamping of substantially inwardly presenting channel form flanged upwardly and downwardly at its edges and an inner stamping secured to the flanged edges of the outer stamping and forming with the outer stamping a hollow threshold structure, said upper flange forming a door overlap and said lower flange being adapted to overlap the side of a sill and be secured thereto.

28. A vehicle body side wall construction including a longitudinal lower edge portion and a door post portion emanating therefrom, said lower edge portion and the door post being formed of a unitary sheet metal stamping of angular cross section, one arm of which extends transversely in the margins of a door opening to a depth substantially equal to the thickness of the wall and is formed at its inner edge with a continuous flange extending into the doorway opening, the lower edge portion being provided with a transversely extending portion adjacent its edge provided with a downwardly extending edge flange adapted to overlap and be secured to a sill, and means interbracing the transversely extending portions of said threshold portion.

29. A front construction for vehicle bodies comprising a cowl, A-post structures and upper and lower windshield headers, said parts being built up of complemental inner and outer sheet metal stampings spaced in their bodies and joined together in their mating edges and forming a substantially continuous intercommunicating h o l l o w structure.

30. A cowl structure for vehicle bodies comprising inner and outer panels curved to conform to the sides and top of the cowl and spaced in their bodies but joined in the bottom, front and rear edge portions of at least one of said panels to provide a hollow reinforced structure.

31. A front structure for vehicle bodies comprising inner and outer sheet metal panels having vertically extending portions spaced in their bodies and joined along the front, bottom and rear edges of at least one of said panels to provide a hollow combined cowl and A-post structure.

32. A vehicle construction comprising a self-sustaining vehicle body superstructure unit adapted to be applied and secured directly to a chassis frame without the use of an intermediate body underframe comprising a downwardly open box-like structure forming the front, side and back walls of the body structure, and at least a portion of the roof in combination with a combined body and chassis underframe extending forwardly and rearwardly beyond the body superstructure and comprising longitudinal and transverse framing adapted to support the flooring and seat structures, the body superstructure being provided with continuous side edge formations conforming to and overlapping the side edges of the underframe and rigidly secured thereto.

33. A self-sustaining vehicle body unit adapted to be applied and secured to a chassis frame without the use of an intermediate body underframe comprising unitary outer sheet metal panels forming, respectively, the front, sides and back of said body and rigidly secured at their edges, the front including a cowl and the sides including threshold portions, and an inner reinforcing structure generally spaced from the body of the outer panels but joined thereto in spaced offset portions of one or the other of said panels or reinforcing structure.

34. A vehicle construction comprising a self-sustaining substantially floorless unit adapted to be assembled and shipped as a unit including the sides, front and back of a closed body superstructure, and having continuous lower side edges conforming in general to the perimetral plan of a chassis underframe, in combination with an underframe serving as the chassis and embodying longitudinal members extending beyond the body superstructure at front and rear and cross braces interconnecting said longitudinal members for supporting floor and seat structures of the body and having lateral edge conformations for receiving the lower side edges of the superstructure, said mating edges being directly secured together and said combined structure forming a combined unitary chassis and body in which the parts of the super-structure and chassis mutually interbrace each other.

35. A combined closed vehicle body and chassis comprising a self-sustaining superstructure unit open at the bottom from the rearmost door post forwardly into the cowl and having a side wall including top header and threshold portions interconnected by door posts, said wall being curved outwardly when viewed in plan, and a chassis frame having side sills and cross braces, the side sills of the chassis being extended beyond the superstructure unit at front and rear and being curved outwardly to correspond with the curve of the lower edge of the side wall of the body superstructure and overlapped by said threshold portion and rigidly secured thereto, whereby the side wall of the body superstructure and the adjacent chassis sill longitudinally mutually reinforce and interbrace each other in the manner of a truss.

36. A combined closed vehicle body and chassis comprising a separate superstructure unit including front, side and rear walls, but open at the bottom from the rearmost door posts forwardly into the cowl, the side walls being outwardly curved and provided with threshold portions forwardly of said rearmost door posts and with a depressed wheel housing section having its lower edge inwardly offset and flanged, and a chassis frame having side sills outwardly curved in their intermediate portions and inwardly offset in their rear portions, and cross braces for the combined body and chassis interconnecting said sills, said body superstructure overlapping the curved outer side walls of said sills in its threshold portions and having said flanged wheel housing portions overlapping the tops of the offset portions of the sills and rigidly secured thereto in said overlapping portions, whereby the body superstructure and chassis together form a unitary structure in which they mutually interbrace and reinforce each other both longitudinally and laterally in the manner of a truss.

37. An A-post structure for vehicle bodies comprising the front portions of inner and outer sheet metal stampings forming a side wall of the body and a portion of a front stamping, all joined along their margins to form a hollow post structure.

In testimony whereof I hereunto affix my signature.

JOSEPH LEDWINKA.